United States Patent Office 3,397,948
Patented Aug. 20, 1968

3,397,948
POLYPHOSPHATE PROCESSES AND PRODUCTS
Robert E. Mesmer, St. Louis, Mo., assignor to Monsanto Company, St. Louis, Mo., a corporation of Delaware
No Drawing. Filed Oct. 1, 1965, Ser. No. 492,327
5 Claims. (Cl. 23—106)

ABSTRACT OF THE DISCLOSURE

A stabilized, dense granular high Form I content sodium tripolyphosphate is disclosed which contains at least about 75% of Form I sodium tripolyphosphate and has a bulk density between about 0.7 and about 1.3 and particles too large to pass through a U.S. Standard 100 mesh screen and contains at least about 0.1 weight percent of sulfate ions dispersed through said particles as a stabilizer.

---

The present invention relates to novel polyphosphate compositions and to processes for their manufacture. More particularly, the present invention relates to special physically stabilized and phase stabilized, relatively dense, granular sodium tripolyphosphates and to processes for their manufacture.

For a long period of time it was believed that the most useful crystalline form of anhydrous sodium tripolyphosphate (STP) was the so-called "low temperature" form, which is often also referred to as the "Phase II" (or "Form II") crystalline form or modification. Although "Phase II" STP hydrated in aqueous media (for example in detergent slurries) relatively slowly, its use made possible the avoidance of some relatively troublesome shortcomings that often resulted from the use of the so-called "high temperature" form ("Phase I" or "Form I") of STP. Perhaps the most important of these "shortcomings" relates to the troublesome formation of "gritty" or sand-like particles in the aqueous media upon the addition to the media of STP which contained a relatively large proportion (i.e., more than about 20 weight percent) of its STP in the "high temperature" (Phase I) crystalline form. However, with the development of improved processes for handling STP containing large proportions of Phase I material (such as those described in U.S. Patents 3,189,551, 3,133,024, and 3,174,934), STP containing large proportions of Phase I material has fairly recently become much more widely used.

Concurrently with this trend toward the use of more "Phase I" STP in the detergent, water-softening, and sequestering art, (as well as others), there has developed still another trend in STP usage; i.e., the use of granular STP materials having relatively higher particle densities. Therefore, a very desirable sodium tripolyphosphate product for contemporary large scale commercial consumption would be one which is (a) granular (having essentially all of its particles larger than 100 mesh, and preferably within the range of from about +100 mesh to about —10 mesh, as measured on a U.S. Standard screen), and (b) relatively dense (having a bulk density of from about 0.7 to about 1.3 grams per cubic centimeter), and is at least about 75 weight percent (based on the total weight of the STP in the product) in the "Phase I" (high temperature) crystalline form. However, for some as yet unexplained reason, it has not been possible (prior to the present invention) to manufacture material having these desired characteristics, because when such manufacture is attempted, practically invariably, as soon as the dense, granular "high Phase I" material had been formed (generally by calcination at an elevated temperature) and cooled to about ambient temperature, it began to spontaneously disintegrate and within a relatively short time reverted into a light, powdery material that had lost not only its desired dense, granular physical form, but also a large proportion of its Phase I content. During the spontaneous physical disintegration of the granules of the dense, granular "high Phase I" STP material, the phase change (to less desirable Phase II materials) also took place. Neither of these changes was desirable in so far as a manufacturer of STP was concerned. To make the problem still more difficult, the above-described spontaneous disintegration did not always occur, although usually it did occur. Illustrative of these difficulties are the comments made by G. W. Morey in an article entitled "The Transition Between the Low and the High-Temperature Form of Sodium Tripolyphosphate," appearing in the Feb. 20, 1958 issue of the Journal of the American Chemical Society, beginning at page 775 and the remarks appearing at page 461 in the Journal of the American Chemical Society, vol. 63, February, 1941, entitled "A Thermal, Microscopic and X-Ray Study of the System $NaPO_3$-$Na_4P_2O_7$," beginning on p. 454.

It is a primary object of the present invention to provide novel, stabilized dense granular "high Phase I" STP products that are not subject to the above-described spontaneous disintegration.

It is another primary object of this invention to provide processes whereby these novel, stabilized, dense granular "high Phase I" STP products can be manufactured.

These and other objects, which will become apparent from the following description and claims, can be accomplished by incorporating into the dense, granular "high Phase I" sodium tripolyphosphate products (which would otherwise be subject to the aforementioned spontaneous disintegration) a small amount of a water-soluble inorganic sulfate salt. The term "water-soluble inorganic sulfate salt" is herein intended to encompass those inorganic sulfate salts that are soluble in distilled water at 25° C. to the extent of at least about 2 weight percent. (That is, at least 2 grams of the sulfate will dissolve completely in 98 grams of distilled water at 25° C.) Thus, the term "water-soluble inorganic sulfate salt" includes, but is not limited to, the alkali metal sulfates (such as $Na_2SO_4$, $K_2SO_4$, $Li_2SO_4$, $Rb_2SO_4$, $Cs_2SO_4$, $NaKSO_4$, $LiKSO_4$, $NaLiSO_4$, and the like, which are preferred embodiments of this aspect of the present invention), $Al_2(SO_4)_3$, $(NH_4)_2SO_4$, $CdSO_4$, $CaSO_4$, $Ce_2(SO_4)_3$, $Cs_2SO_4$, $CrSO_4 \cdot 7H_2O$, $Cr_2(SO_4)_3 \cdot 18H_2O$, $CoSO_4$, $CuSO_4$, $Dy_2(SO_4)_3$, $Er_2(SO_4)_3$, $Eu_2(SO_4)_3$, $Gd_2(SO_4)_3$, $Ga_2(SO_4)_3$, $2N_2H_4 \cdot H_2SO_4$, $N_2H_4 \cdot H_2SO_4$, $In_2(SO_4)_3$, $Ir_2(SO_4)_3$, $FeSO_4$, $La_2(SO_4)_3$, $MgSO_4$, $MnSO_4$, $Nd_2(SO_4)_3$, $NiSO_4$, $PdSO_4$, $Pt(SO_4)_2$, $Pr_2(SO_4)_3$, $Rh_2(SO_4)_3$, $Rb_2SO_4$, $Sm_2(SO_4)_3$, $Sc_2(SO_4)_3$, $Ag_2SO_4$, $Tb_2(SO_4)_3$, $Tl_2SO_4$, $Th(SO_4)_2$, $SnSO_4$, $Sn(SO_4)_2$, $UO_2SO_4$, $Yb_2(SO_4)_3$, $Y_2(SO_4)_3$, $ZnSO_4$, $Zr(SO_4)_2$, and their hydrates. Apparently it is the sulfate anion ($SO_4^=$) that is the effective component in the stabilized STP compositions of the present invention. The reason that the particular inorganic sulfate that should be present in the stabilized STP compositions of the present invention should preferably be fairly water-soluble is that for most commercial uses of STP, substantially completely water-soluble STP is generally desired. Thus, the particular type of inorganic sulfate that is initially intermixed with the STP is not critical. The only requirement is that the resulting stabilized, dense, granular "high Phase I" STP product (containing the small amount of inorganic sulfate) is substantially completely water-soluble. It is also apparent that the sulfate must be fairly evenly distributed through the particles of stabilized STP (rather than merely on their surfaces) in order to effectively stabilize the dense, granular "high Phase I" material.

Although the presence of even extremely small amounts of one or more of the aforesaid inorganic sulfate salts in the dense, granular "high Phase I" STP products that are otherwise ordinarily subject to the spontaneous disintegration described above (and that are therefore useful subjects upon which to practice the present invention) has at least some beneficial stabilizing effect, generally in order to yield sufficient stabilizing benefits for such benefits to be readily noticeable as the result of ordinary (non-instrumental) observation of the "stablized" material, there should be at least about 0.1 weight percent of sulfate anions incorporated fairly uniformly through the stabilized dense, granular "high Phase I" STP. Although for practically complete stabilization, apparently relatively higher levels of sulfate anions must be present in the relatively more dense STP products of the present invention (that also contain relatively higher levels of the Phase I STP crystalline modification; i.e., those containing >90% Phase I STP), generally practically complete stabilization can be obtained by incorporating enough of one or more of the above-described inorganic sulfate salts into the material to be stabilized to yield at least about 0.2 weight percent of sulfate anions in the resulting stabilized product. When it is desired to practically completely stabilize extremely pure "high Phase I" STP products (containing 95 weight percent of more of Phase I material) that are also very dense (having bulk densities between about 1.0 and about 1.3)— which STP products are extremely difficult to stabilize— generally at least about 0.25 weight percent of sulfate anions must be present in the effectively stabilized very dense, granular, "very high Phase I" STP products. No critical upper limit regarding the amount of sulfate anions is known, although from the following description of the STP products that can be treated in accordance with the processes of this invention it will become apparent that at most about 25 weight percent of sulfate salts should be present in the stabilized products resulting therefrom. However, generally no additional advantages can be obtained by using more than about 5 weight percent of sulfate anions to accomplish the desired degree of physical and phase stabilization of dense, granular "high Phase I" STP in the practice of the present invention.

The sodium tripolyphosphate products that can be treated most successfully in the practice of the present invention are those having a "T.R." of about 25 or more. "T.R." in a trade-recognized term meaning "Temperature Rise," which in turn is an indication of the amount of Phase I material in the particular sodium tripolyphosphate product being referred to in terms of T.R. The determination of T.R. is accomplished in standard test involving the measurement of the amount of heat evolved by a particular sample of sodium tripolyphosphate when it becomes hydrated to the hexahydrate while suspended in wet glycerine. Glycerine inhibits the hydration of "Phase II" STP but does not inhibit the hydration of Phase I STP. Thus, it can readily be appreciated that the total amount of heat evolved from a given sample of sodium tripolyphosphate, when the sample is subjected to this standard "T.R." test, serves as an excellent indication of the total amount of Phase I STP in the sample. The determination of the amount of Phase I material by the "T.R." test is fairly accurate, the results from the "T.R." test having been confirmed by X-ray diffraction techniques. A detailed discussion of the "T.R." test can be found in an ASTM Bulletin, July 1953, pp. 45–48 (by J. D. McGilvery). Of those STP products having T.R.'s of 25 or more, those having relatively higher T.R.'s are somewhat more difficult to stabilize (to prevent the spontaneous degradation described above). Therefore application of the processes of the present invention to STP products having T.R.'s of 27 or more represent preferred embodiments of this invention. In terms of the "assay" of these STP products, those that can be successfully stabilized in accordance with the present processes must contain at least about 85 weight percent of sodium tripolyphosphate. Of this, at least about 70 weight percent should be Phase I material.

Minor amounts of other materials can be present in these STP products. However, generally at least about 95 weight percent of the products that are treated via the processes of this invention should be polyphosphatic in nature and should be (in addition to at least about 85 weight percent of STP) either pyrophosphates, "glassy" (chain) metaphosphates or trimetaphosphates or mixtures thereof. These STP products are typical, relatively dense, granular materials that can be manufactured by any particular conventional calcination or fusion process desired, since apparently the particular process by which they are manufactured does not greatly influence the beneficial results that can be obtained by practicing the present processes. The ratio of Na/P in such products, however, should generally be from about 1.65 to about 1.70. The greatest benefits from practicing the present invention, however, are obtainable when the Na/P ratio of the hot STP product is within the range of from about 1.66 to about 1.68.

The inorganic sulfate salts useful in the practice of the present invention can be incorporated into the "high Phase I" STP products via any particular manner desired without detracting substantially from the benefits that can result from practicing the present invention, so long as the resulting STP product has the required relatively high bulk density (as set out above) and is granular in form (rather than powdered). One excellent way for the introduction of the inorganic sulfate into the "high Phase I" STP is by simply adding an appropriate amount of the inorganic sulfate to the orthophosphate feed solution or slurry before drying and feeding it to the calciner or furnace in which the dense granular "high Phase I" STP product is to be manufactured. Since, ordinarily, STP is manufactured by calcining or fusing a blend of monosodium orthophosphate, and disodium orthophosphate, the raw material "calciner" feed stream that is to be calcined in processes for the manufacture of the novel, stabilized dense granular "high Phase I" STP products of this invention will generally consist essentially of a blend of these two orthophosphates, possibly some recycled STP, and one (or more) of the above-described inorganic sulfate salts. The Na/P ratio of this feed stream is generally between about 1.65 and about 1.70, and is preferably between 1.66 and about 1.68.

Although any of the inorganic sulfate salts described above can be utilized in the preparation of the specially stabilized "high Phase I" STP products of the present invention, it is preferred that $Na_2SO_4$, $K_2SO_4$, or mixtures thereof be utilized.

In the following examples, which represent some of the preferred embodiments of the present invention, all parts are by weight unless otherwise specified.

EXAMPLE I

An aqueous solution containing 620 parts of monosodium orthophosphate, 370 parts of disodium orthophosphate, and 10 parts of sodium sulfate is dried on a conventional steam heated, stainless steel drum dryer. The resulting damp flakes are then introduced into one end of a conventional direct-fired countercurrent rotary calciner. Just after the feed is introduced into the calciner, it is intermixed with 15 weight percent of water, the water being sprayed onto the powdered material (as it revolves in the calciner) over a period of about one minute. The temperature of the resulting mixture is then raised over a period of about 20 minutes to about 550° C. at which point almost 90 weight percent of the mixture is Phase I STP. The temperature of the reaction mixture is maintained at about 550° C. for an additional 30 minutes after which it is found to contain 96 weight percent of Phase I STP. This material is then removed from the calciner and screened. The granular fraction of the product (100 weight percent of +100 mesh material) represents the desired dense granular "high Phase I" STP product. The T.R. of this granular fraction is 30.

The dense granular product is analyzed and found to have bulk density of about 0.9 gram per cc. It is physically stabilized and phase stabilized to the extent that it does not spontaneously disintegrate significantly under ordinary conditions of storing and handling over a period of many months. By comparison, a "high Phase I" STP product that is manufactured in a practically identical manner, except that no sulfate anions were added to the raw material feed stream, spontaneously reverted to mostly Phase II material and physically disintegrated to a powder by the time it is cooled to ambient temperatures. For example, instead of retaining the desired characteristics (as exemplified by the dense granular material containing 1 weight percent of sodium sulfate) this conventionally manufactured material has the following characteristics after its spontaneous disintegration:

| | |
|---|---|
| Total STP content _____percent__ | 96 |
| Total "Phase I" STP _____do___ | 49 |
| Tetrasodium pyrophosphate _____do___ | 3 |
| Sodium trimetaphosphate _____do___ | 0.2 |
| Temperature Rise (T.R.) _____ | 18 |
| Particle size distribution (—100 mesh) ___percent__ | 95 |

EXAMPLE II

In a process such as that detailed in Example I above, a dense granular "high Phase I" STP product is manufactured by calcining a blend containing 62 weight percent of monosodium orthophosphate, 37 weight percent of disodium orthophosphate, and 1 weight percent of K$_2$SO$_4$. In addition to being successfully physically stabilized and phase stabilized, the resulting dense granular product had the following characteristics:

| | |
|---|---|
| Total STP content _____percent__ | 96 |
| Total "Phase I" STP _____do___ | 95 |
| Tetrasodium pyrophosphate _____do___ | 3 |
| Sodium trimetaphosphate _____do___ | 0.2 |
| Bulk density _____grams/cc__ | 1.0 |
| Temperature Rise (T.R.) _____ | 30 |
| Particle Size distribution: | |
| +20 mesh _____percent by weight__ | 8 |
| —20 +40 mesh _____do____ | 40 |
| —40 +60 mesh _____do____ | 40 |
| —60 +100 mesh _____do____ | 12 |

EXAMPLE III

In a process such as that detailed in Example I above, a dense granular "high Phase I" STP product is manufactured by calcining a blend containing 62 weight percent of monosodium orthophosphate, 37 weight percent of disodium orthophosphate, and 1 weight percent of Na$_2$SO$_4$. In addition to being successfully physically stabilized and phase stabilized, the resulting dense granular product had the following characteristics:

| | |
|---|---|
| Total STP content _____percent__ | 93 |
| Total "Phase I" STP _____do___ | 90 |
| Tetrasodium pyrophosphate _____do___ | 6 |
| Sodium trimetaphosphate _____do___ | 0.2 |
| Bulk density _____grams/cc__ | 0.9 |
| Temperature Rise (T.R.) _____ | 28.5 |
| Particle size distribution (+100 mesh) __percent__ | 100 |
| +20 mesh _____percent by weight__ | 8 |
| —20 +40 mesh _____do____ | 40 |
| —40 +60 mesh _____do____ | 40 |
| —60 +100 mesh _____do____ | 12 |

EXAMPLE IV

A very dense STP product is prepared initially by melting together at 900° C. a mixture of 2.00 lb. moles of disodium orthophosphate, 1.00 lb. moles of monosodium orthophosphate, and 0.8 lb. of Na$_2$SO$_4$ and subsequently quickly chilling the resulting "melt." The chilled "melt" product is then passed through a conventional coarse mill and screened. That fraction which is retained on a 100 mesh screen is then reheated to 550° C. and held at about this temperature for 4 hours. The resulting very dense "high Phase I" STP product has the following characteristics:

| | |
|---|---|
| Temperature Rise (T.R.) _____ | 30.4 |
| Total STP content _____percent__ | 98 |
| Total "Phase I" STP _____do___ | 97 |
| Tetra sodium pyrophosphate _____do___ | 1.3 |
| Sodium trimetaphosphate _____do___ | 0.7 |
| Bulk density _____grams/cc__ | 1.3 |
| Particle size (—20 +100 mesh) _____percent__ | 100 |

This hot very dense granular STP product is then cooled gradually (over a period of 40 minutes) in a conventional STP cooler to about 30° C. Then the product is removed from the cooler and stored for observation. Under ambient conditions (in a conventional STP storage silo) the resulting granular "high Phase I" STP product retained its excellent physical and chemical stability over the entire storage test period of more than a month. In an otherwise similar procedure in which a very dense granular "high Phase I" STP product is prepared (but in which the Na$_2$SO$_4$ is absent from the initial "melt") 55% of the original Phase I STP reverts to Phase II materials by the time the temperature of the "granular" product is finally cooled to below 30° C. The T.R. of this product is only 17. In addition the granules of this product spontaneously disintegrate during this conventional cooling step, so that by the time the temperature of the originally granular STP product reaches about 30° C., 85 weight percent of it is powdered (—100 mesh) material.

What is claimed is:

1. Dense, granular sodium tripolyphosphate having a Form I sodium tripolyphosphate content of at least about 75 weght percent, a bulk density between about 0.7 and about 1.3, particles too large to pass through a U.S. Standard 100 mesh screen and containing at least about 0.1 weight percent of sulfate ions dispersed through said particles.

2. Dense, granular sodium tripolyphosphate having a Form I sodium tripolyphosphate content of at least about 84 weight percent and a bulk density between about 0.7 and about 1.3; the particles of said dense granular sodium tripolyphosphate being substantially all too large to pass through a U.S. Standard 100 mesh screen and too small to be contained on a U.S. Standard 10 mesh screen, and said particles containing at least about 0.2 weight percent of sulfate ions evenly distributed therethrough.

3. Dense, granular sodium tripolyphosphate having a Form I sodium tripolyphosphate content of at least about 90 weight percent and a bulk density between about 1.0 and about 1.3; the particles of said dense granular sodium tripolyphosphate being too large to pass through a U.S. Standard 100 mesh screen and too small to pass through a U.S. Standard 10 mesh screen, and containing, dispersed therethrough, between about 0.2 and about 5 weight percent of sulfate anions.

4. Dense, granular sodium tripolyphosphate, as in claim 3, wherein said Form I sodium tripolyphosphate content is at least about 94 weight percent, and the amount of said sulfate anions contained dispersed through said particles of sodium tripolyphosphate is between about 0.25 and about 5 weight percent.

5. A process for preparing a stabilized, dense, granular sodium tripolyphosphate containing at least about 75 weight percent of Form I sodium tripolyphosphate comprising adding at least about 0.1 weight percent of a sulfate ion to a blend of monosodium orthophosphate and disodium orthophosphate and thereafter calcining said blend at a temperature sufficient to produce said stabilized, dense, granular sodium tripolyphosphate product containing at least about 75 weight percent of Form I sodium tripolyphosphate.

References Cited

UNITED STATES PATENTS

| | | | |
|---|---|---|---|
| 2,916,354 | 12/1959 | Edwards | 23—106 |
| 3,322,493 | 5/1967 | Pals | 23—106 |

OSCAR R. VERTIZ, *Primary Examiner.*

L. A. MARSH, *Assistant Examiner.*